(12) United States Patent
Wu et al.

(10) Patent No.: US 7,852,901 B2
(45) Date of Patent: *Dec. 14, 2010

(54) METHOD AND APPARATUS FOR MANUFACTURING HIGH-PURITY ALLOY

(75) Inventors: Yuan-Pang Wu, Longtan Township, Taoyuan County (TW); Hui-Yun Bor, Longtan Township, Taoyuan County (TW); Rong-Ruey Jeng, Longtan Township, Taoyuan County (TW)

(73) Assignee: Chung Shan Institute of Science and Technology, Armaments Bureau, M.N.D., Taoyuan Country (TW)

( * ) Notice: Subject to any disclaimer, the term of this patent is extended or adjusted under 35 U.S.C. 154(b) by 120 days.

This patent is subject to a terminal disclaimer.

(21) Appl. No.: 12/233,139

(22) Filed: Sep. 18, 2008

(65) Prior Publication Data

US 2010/0064849 A1    Mar. 18, 2010

(51) Int. Cl.
*C22B 9/04*    (2006.01)

(52) U.S. Cl. ...................................... 373/141; 266/208
(58) Field of Classification Search ................. 373/141; 266/208

See application file for complete search history.

(56) References Cited

U.S. PATENT DOCUMENTS

| 7,651,546 B2 * | 1/2010 | Wu et al. ....................... 75/330 |
| 2005/0259712 A1 * | 11/2005 | Lazor ......................... 373/144 |

* cited by examiner

*Primary Examiner*—George Wyszomierski
*Assistant Examiner*—Tima M McGuthry-Banks
(74) *Attorney, Agent, or Firm*—Ming Chow; Sinorica, LLC (57) ABSTRACT

An electromagnetic induction heat device to heat a first metal mineral stone and a second mineral stone to form a melting mixture liquid without stifling. The device keeps a temperature of the melting mixture liquid between solidus and liquidus of binary alloy phase diagram of the first and second metal mineral stone, then an alloy with solid state precipitates from said melting mixture liquid.

4 Claims, 8 Drawing Sheets

METHOD AND APPARATUS FOR MANUFACTURING HIGH-PURITY ALLOY

FIELD OF THE INVENTION

The present invention relates generally to a method and apparatus for manufacturing alloy, and particularly to a method and apparatus for manufacturing high-purity alloy.

BACKGROUND OF THE INVENTION

As the new products of the photo-electricity, semiconductor and energy are developed, the material's requirement is from the traditional alloy of steel or aluminum alloy to a new type's alloy, which is like the semiconductor's material of GaN, GaAs or $CuInSe_2$. The composition of the traditional alloy has a specific range. Furthermore, the impurity's content of the higher quality's traditional alloy must be limited. Hence, the metallurgical technology or smelting method with tradition, for example, vacuum induction melting, utilizes online analysis to adjust each element of the composition in alloy melting's liquid state. Nevertheless, the precision of above online analysis's control just attains to ±0.1%. In cooling and solidify process, either much or little segregation still appear according to different alloys' natural phase diagrams. Accordingly, the micro-structure of the material has much precipitation phase or segregation so the material is not uniform, but this phenomenon is accepted by traditional materials.

However, this phenomenon is not accepted by the new materials of the solar cell, magnetic recording and semiconductor. The new materials of the solar cell, magnetic recording and semiconductor must have high purity, which not only relates to impurity's content of the material but also relates to stoichiometry of the material. For these new materials, the off-stoichiometry of the material just has a little error (the precision is less than ±0.1%) and the feature of the materials, for example, resistance coefficient, light's refractive index, reflecting rate or magnetism is completely different. Hence, these new materials are manufactured by the method of physical vapor deposition or high purity powder metallurgy. Nevertheless, the method of physical vapor deposition or high purity powder metallurgy is too expensive.

The mixture alloy usually results uniform property from the big different melting of the different metal material, so this invention provides a method and apparatus for manufacturing high-purity alloy. The method and apparatus for manufacturing high-purity alloy can economize the cost of the method of physical vapor deposition or high purity powder metallurgy. Furthermore, this invention can get high purity alloy, which is used for the material of the solar cell, magnetic recording and semiconductor.

SUMMARY OF THE INVENTION

An objective of the present invention is to provide a method and apparatus for manufacturing high-purity alloy that economize the cost of the method of physical vapor deposition or high purity powder metallurgy and high purity alloy is got.

Another objective of the present invention is to provide a method and apparatus for manufacturing high-purity alloy, which can get high purity alloy, which is used for the material of the solar cell, magnetic recording and semiconductor.

In order to achieve the objectives described above, the present invention provides a method and apparatus for manufacturing high-purity alloy. The method and apparatus of the present invention disclose the electromagnetic induction heat device to heat a first metal mineral stone and a second mineral stone to form a melting mixture liquid without stirring. Keep a temperature of the melting mixture liquid between solidus and liquidus of binary alloy phase diagram of the first and second metal mineral stone, then an alloy with solid state precipitates from said melting mixture liquid.

DETAILED DESCRIPTION OF THE PREFERRED EMBODIMENTS

Figure 1:
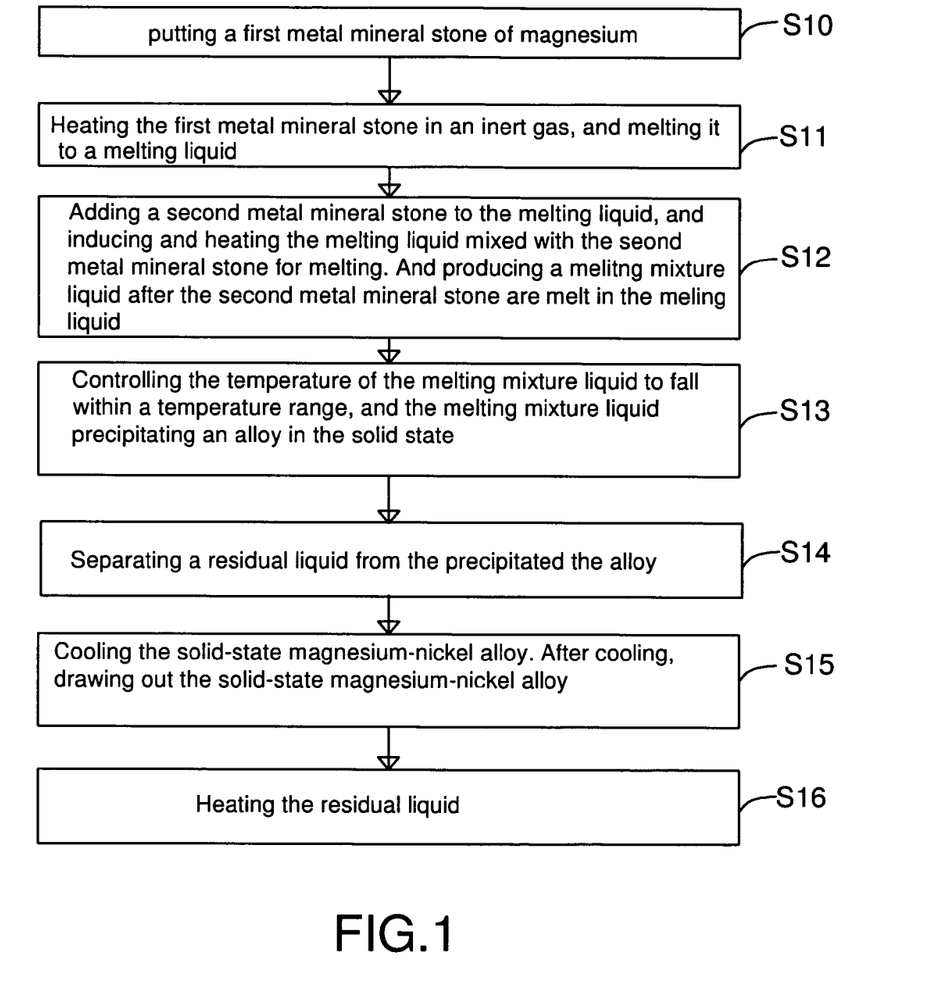
FIG. 1 shows a flowchart according to a preferred embodiment of the present invention.
Figure 2A:
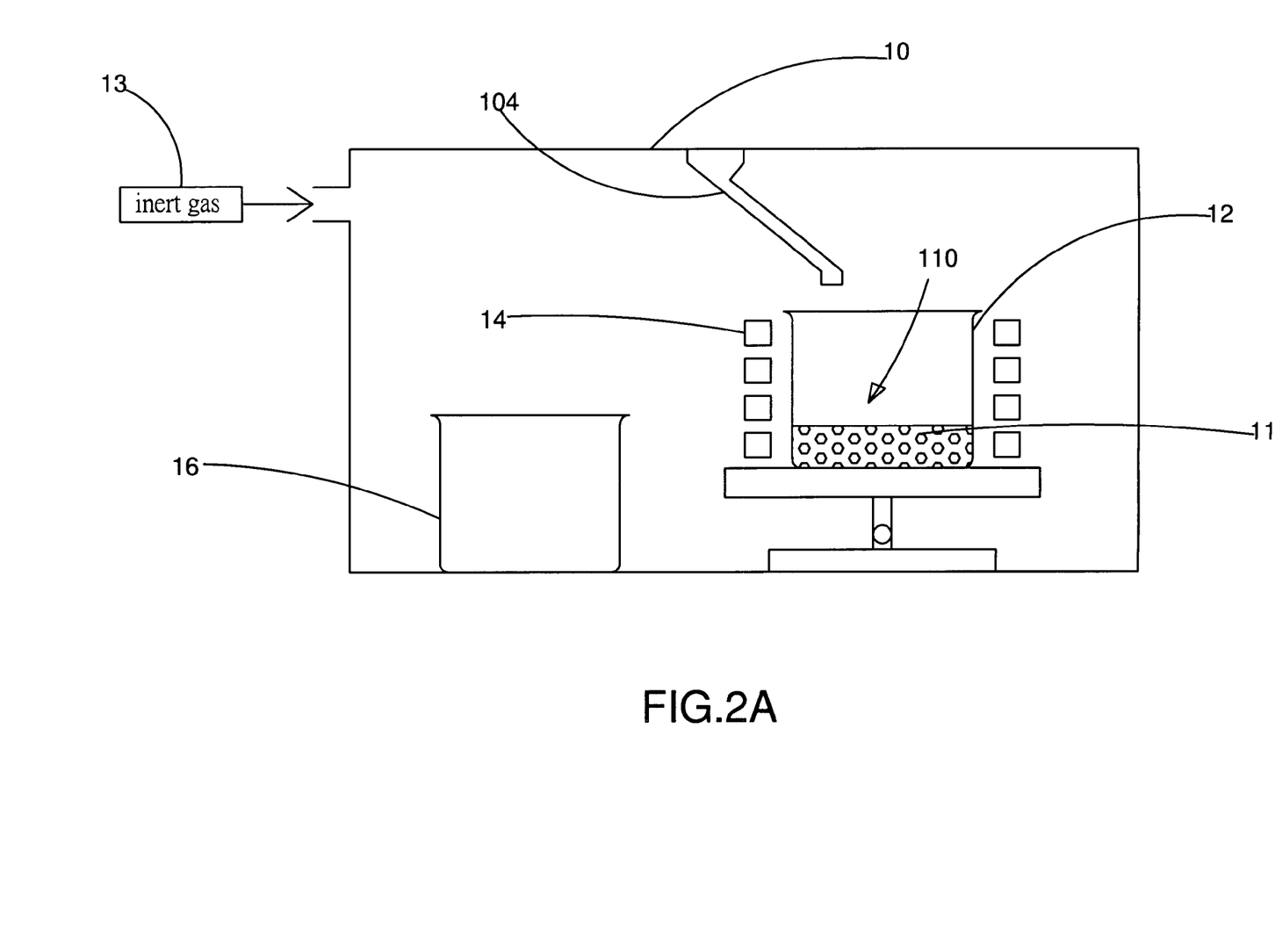
FIG. 2A shows a schematic diagram of the apparatus in the steps S10 and S11 according to a preferred embodiment of the present invention.

Refer to FIG. 1 and FIG. 2A show a flowchart and a schematic diagram of the apparatus in the steps S10 and S11 according to a preferred embodiment of the present invention. As shown in the figure, the present invention provides a method and apparatus for manufacturing high-purity alloy. The apparatus comprises a vacuum chamber 10 with a material feeding tube 104, a first crucible 12, an electromagnetic induction heat device 14 and a second crucible 16. By using the apparatus, the step S10 is executed for putting a first metal mineral stone 11 into the first crucible 12, where the first metal mineral stone 11 is a metal bulk, and the material of the first crucible 12 is a ceramic material with melting point greater than that of the feeding metal material. Then, gas an inert gas 13 into the vacuum chamber 10, and put the first crucible 12 with the first metal mineral stone 11 into the vacuum chamber 10. Before gassing the inert gas 13 into the vacuum chamber 10, the inert gas 13 is first used to purge the vacuum chamber 10. Finally, seal the vacuum chamber 10, and let the inert gas 13 be maintained in the vacuum chamber 10. After the first crucible 11 loaded with the first metal mineral stone 11 is put into the vacuum chamber 10, the step S11 is executed for setting the first crucible 12 in the electromagnetic induction heat device 14, which is used for heating the first metal mineral stone 11 in the first crucible 12 to be totally melt and become a melting liquid 110. The electromagnetic induction heat device 14 can adjust heat temperature and melt the metal mineral stone 11. Furthermore, the metal mineral stone 11 and the melting liquid 110 are induced and dispersed uniformly by the electromagnetic induction heat device 14, so as to not need stirring process.

Figure 2B:
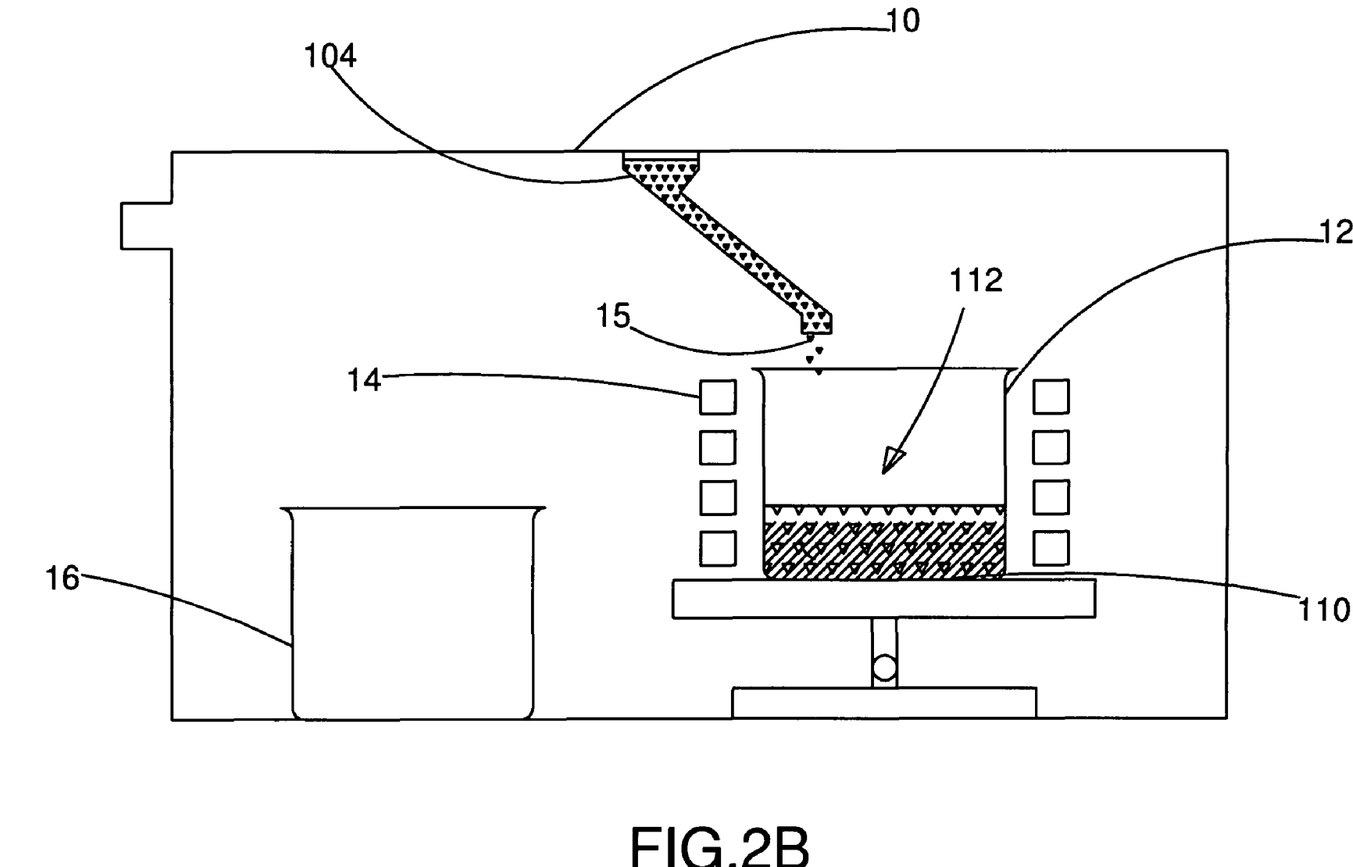
FIG. 2B shows a schematic diagram of the apparatus in the step S12 according to a preferred embodiment of the present invention.

FIG. 2B shows a schematic diagram of the apparatus in the step S12 according to a preferred embodiment of the present invention. As shown in the figure, after the metal mineral stone 11 in the first crucible 12 is melt into the melting liquid 110, the step S12 is executed for adding a second metal mineral stone 15 slowly to the melting liquid 110 in the first crucible 12 by using the material feeding tube 104. Besides, the electromagnetic induction heat device 14 is used for heating the first crucible 12 with the melting liquid 110 and the second metal mineral stone 15 so that the temperature of the melting liquid 110 is heated above the melting point of the first and second metal mineral stone. Thereby, the second metal mineral stone 15 are melt completely in the melting liquid 110 and a melting mixture liquid 112 is uniformly produced by the electromagnetic induction heat device 14. The composition ratio of the final high-purity solid-state alloy without other phases precipitated from the first metal mineral stone and second metal mineral stone is in accordance with the designer.

Figure 2C:
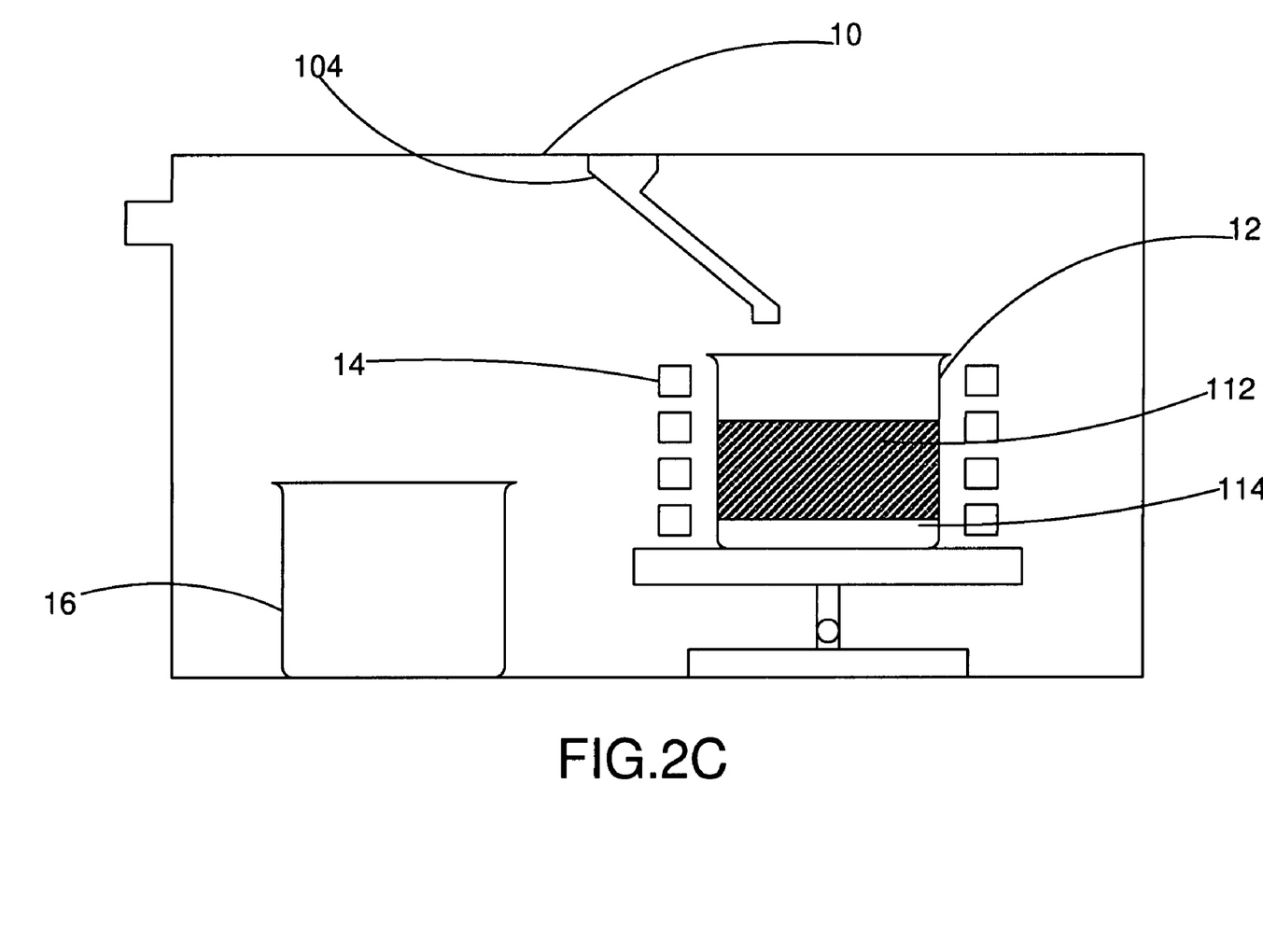
FIG. 2C shows a schematic diagram of the apparatus in the step S13 according to a preferred embodiment of the present invention.

FIG. 2C shows a schematic diagram of the apparatus in the step S13 according to a preferred embodiment of the present invention. As shown in the figure, when the melting mixture liquid 112 is produced, the step S13 is executed for controlling the temperature of the electromagnetic induction heat device 14 to fall within a temperature range. Thereby, the temperature of the melting mixture liquid 112 will be within the temperature range, which is above the solidification temperature and below the liquification temperature of the melting mixture liquid 112. Thereby, according to the present invention, it is not necessary to adopt accurate and costly temperature control systems. In addition, the precipitated quantity (weight) of an alloy 114 depends on the composition of the melting liquid and the precipitation temperature. In general, within the broad ranges of composition and temperature conditions according to the present invention, the higher the proportion of the first metal mineral stone and the lower the precipitation temperature, the more the precipitated quantity of the alloy 114. The exact precipitated quantity (weight) can be calculated according to the level rule of phase diagram in physical metallurgy.

Figure 2D:
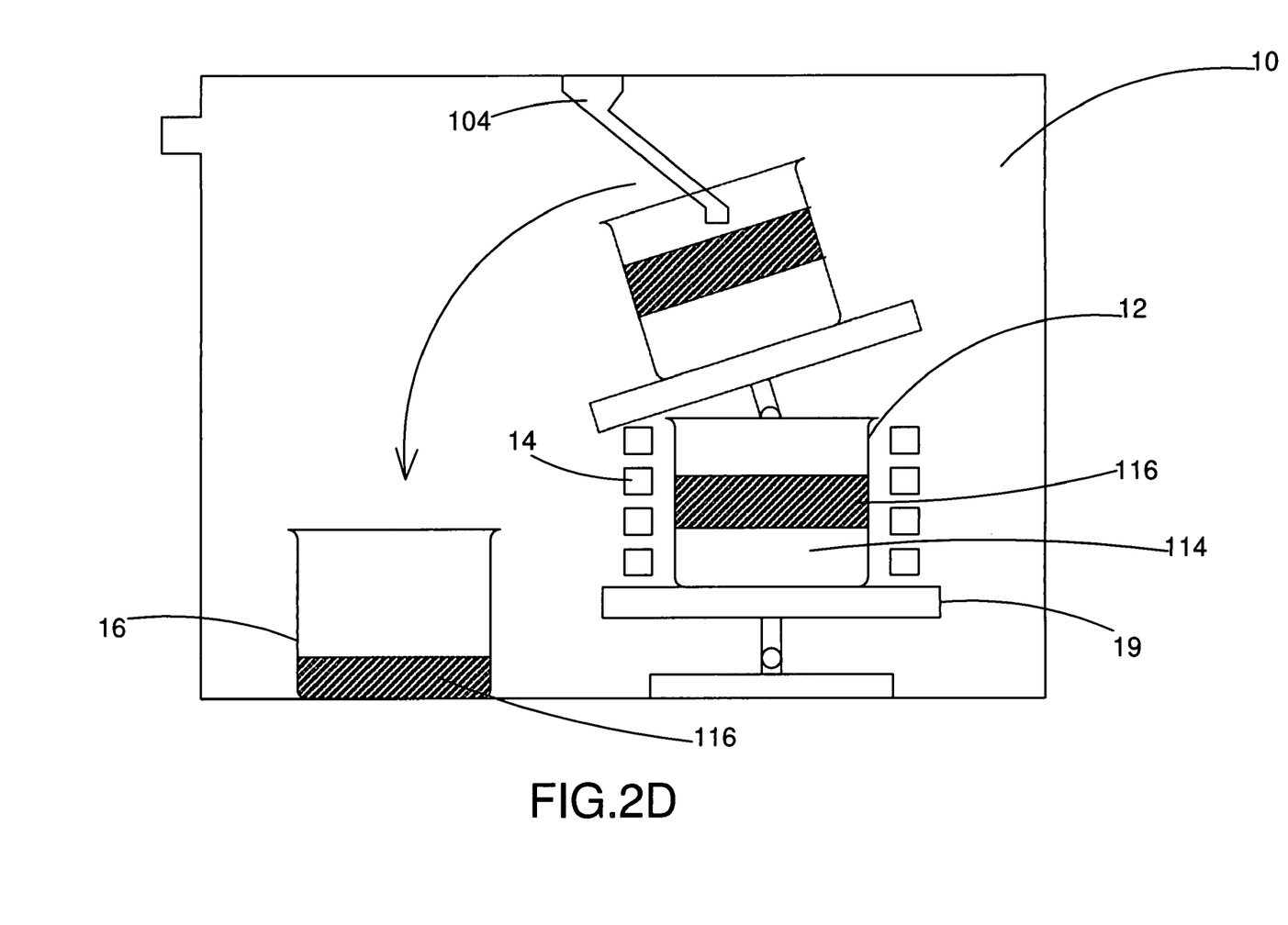
FIG. 2D shows a schematic diagram of the apparatus in the step S14 according to a preferred embodiment of the present invention.

FIG. 2D shows a schematic diagram of the apparatus in the step S14 according to a preferred embodiment of the present invention. As shown in the figure, the alloy 114 in solid-state is precipitated from the melting liquid 112. The first metal mineral stone composition of the alloy 114 is greater than that in the melting liquid 112. With the progress of precipitation reaction, according to the law of conservation of mass, the composition of a residual liquid 116 still have metal-rich. The density of the first metal mineral stone is much greater than that of the second metal mineral stone, therefore, the alloy 114 will sink at the bottom of the first crucible 12. After the melting liquid 112 precipitated the alloy 114, the step S14 is executed for separating the residual liquid 116 in the first crucible 12 from the alloy 114 suck at the bottom of the first crucible 12 by pouring the residual liquid 116 in the first crucible 12 into the second crucible 16. In order to pour the residual liquid 116 in the first crucible 12 into the second crucible 16 easily, an inclinable base 19 is adapted in the vacuum chamber 10 with the first crucible 12 and the electromagnetic induction heat device 14 set thereon. When the base 19 inclines the first crucible 12 and the electromagnetic induction heat device 14 incline with the inclinable base 19, and the residual liquid 116 will be poured into the second crucible 16. Finally, the alloy 114 will be left at the bottom of the first crucible 12.

Figure 2E:
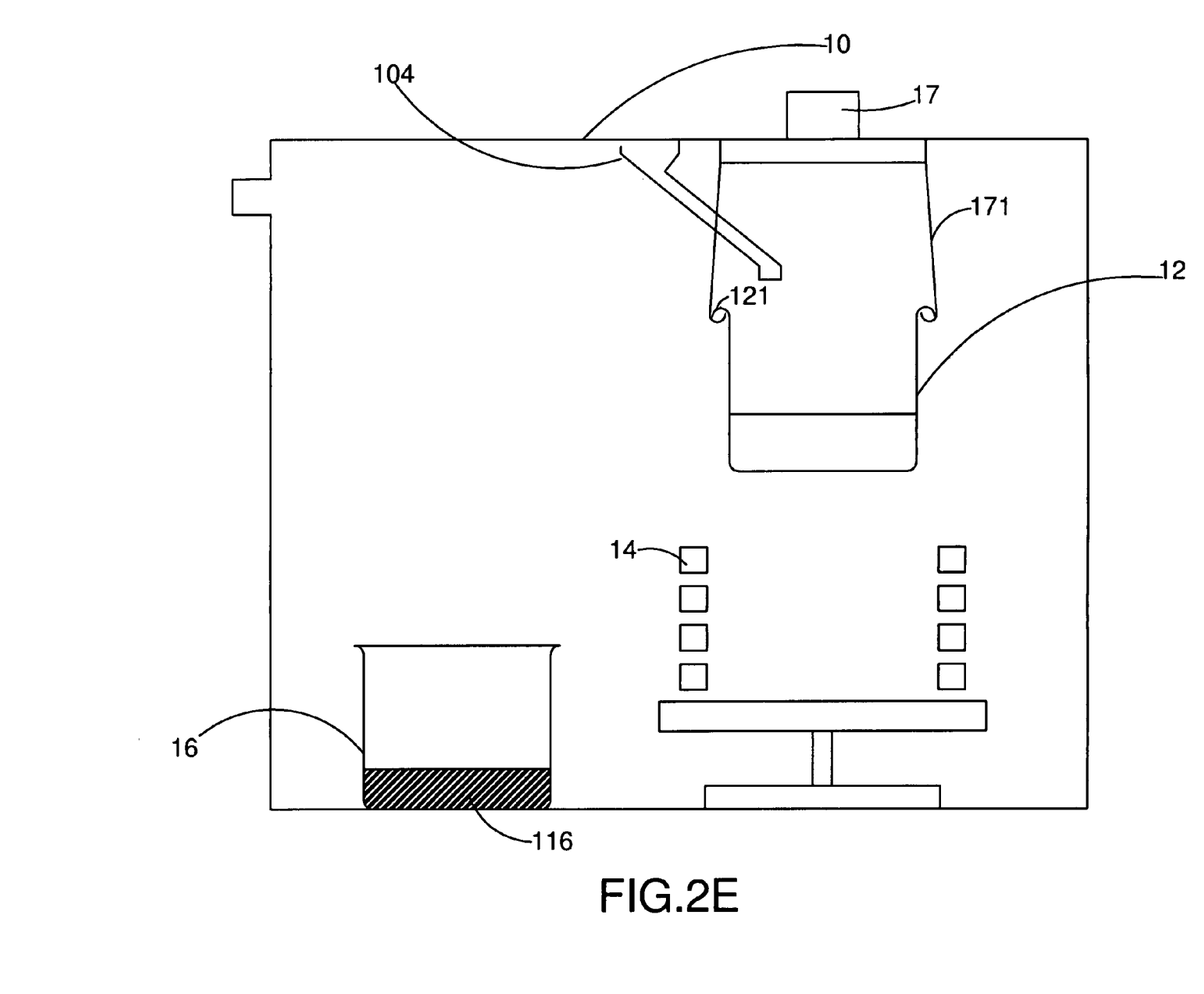
FIG. 2E shows a schematic diagram of the apparatus in the step S15 according to a preferred embodiment of the present invention.

FIG. 2E shows a schematic diagram of the apparatus in the step S15 according to a preferred embodiment of the present invention. As shown in the figure, the step S15 is executed. Draw out the first crucible 12 from the electromagnetic induction heat device 14, and cool the first crucible 12 loaded with the alloy 114. In or to draw out the first crucible 12 from the electromagnetic induction heat device 14 conveniently, a hoist mechanism 17 is further adapted in the vacuum chamber 10 and deposes the bottom of the chilled plate for moving the first crucible 12 up and down to leave the electromagnetic induction heat device 14. The hoist mechanism 17 includes a plurality of twisted ropes 171, which is fixed on a curved fringe 121 of the first crucible 12. Thereby, the hoist mechanism 17 can draw out the first crucible 12 from the electromagnetic induction heat device 14. In addition, in order to secure the connection between the hoist mechanism 17 and the first crucible 12, a curved fringe 121 is adapted at the periphery of the opening of the first crucible 12. A hanging hook (not shown in the figure) is adapted on one end of the plurality of twisted ropes 171 of the hoist mechanism 17, respectively. Thereby, the hanging hooks are hooked on the curved fringe 121 of the first crucible 12. Thus, the connection between the hoist mechanism 17 and the first crucible 12 is secured. Then, the hoist mechanism 17 can move the first crucible 12 from the heat device 14 for putting the residual liquid 116 to the second crucible 16.

Figure 2F:
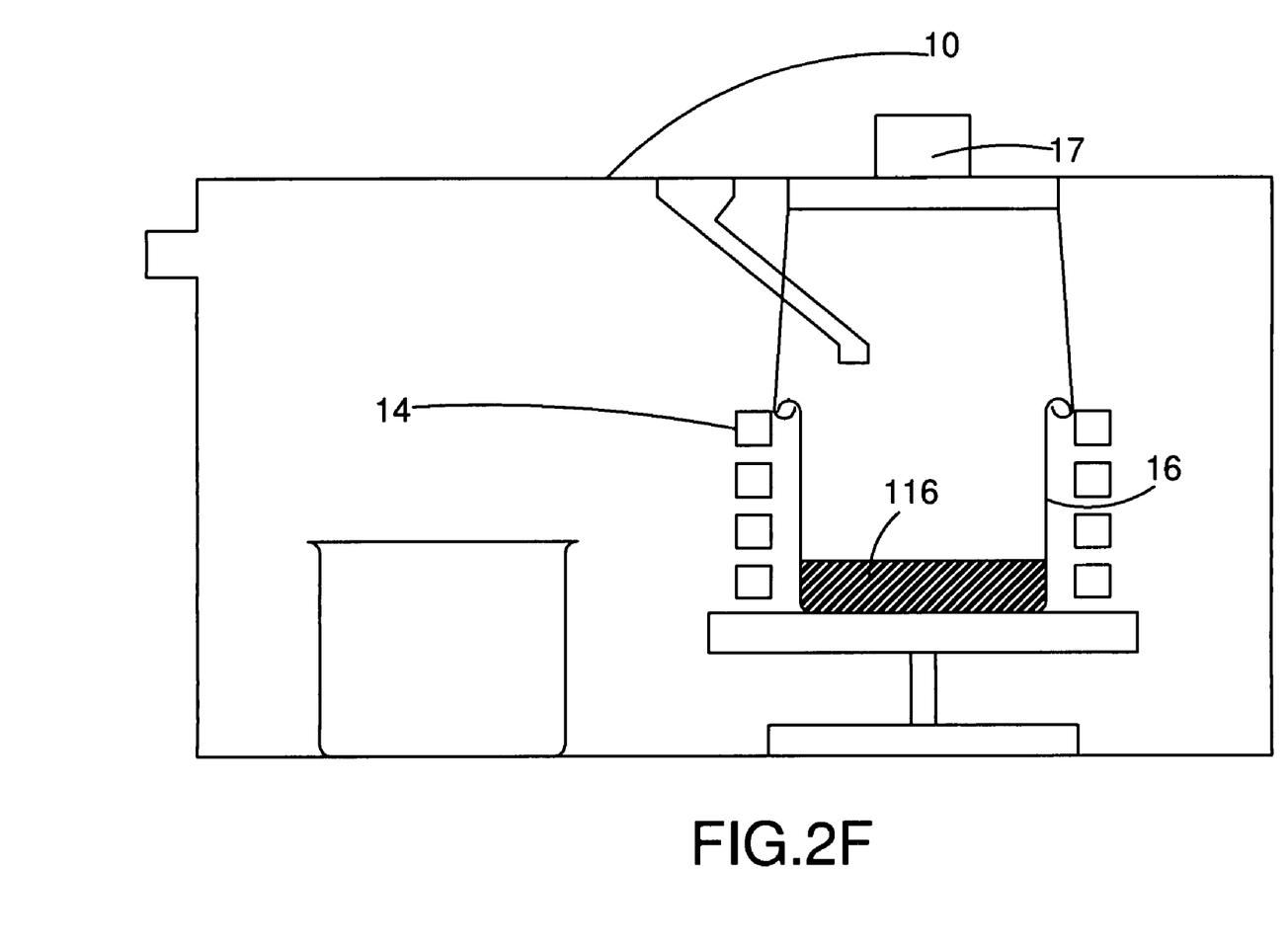
FIG. 2F shows a schematic diagram of the apparatus in the step S16 according to a preferred embodiment of the present invention.

Another significant technological breakthrough of the present invention is to recycle the residual liquid, and thereby a method and apparatus for continuously manufacturing high-purity alloy is developed. FIG. 2F shows a schematic diagram of the apparatus in the step S16 according to a preferred embodiment of the present invention. As shown in the figure, after the first crucible 12 is drawn out from the electromagnetic induction heat device 14, the step S16 is executed for putting the second crucible 16 loaded with the residual liquid 116 into the heating device 14 by using the hoist mechanism 17. Then, the steps from S10 through S16 are executed repeatedly for continuously manufacturing the high-purity alloy 114. The first and the second crucibles 12, 16 are used alternately owing to continuous manufacturing.

While manufacturing continuously, the second and thereafter manufacturing cycles differ from the first manufacturing cycle in that, in the second and thereafter manufacturing cycles, in order to increase productivity of the alloy 114, the amount of added the second metal mineral stone can be increased.

Figure 3:
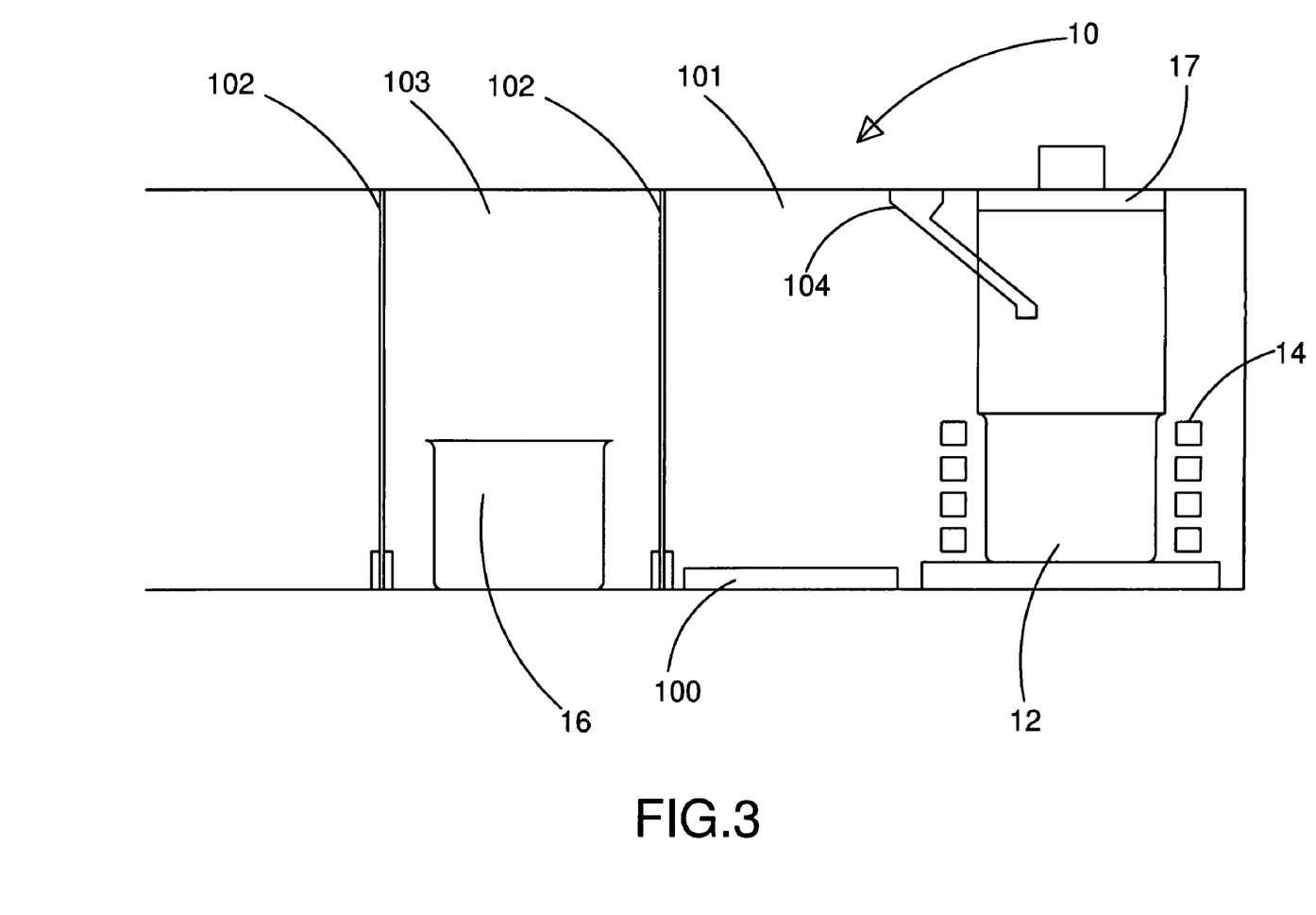
FIG. 3 shows a schematic diagram of the apparatus according to another preferred embodiment of the present invention.

FIG. 3 shows a schematic diagram of the apparatus according to another preferred embodiment of the present invention. As shown in the figure, the present invention provides an apparatus for manufacturing a high-purity alloy and comprising a vacuum chamber 10, a first crucible 12, an electromagnetic induction heat device 14, a second crucible 16, a hoist mechanism 17, a water-cooled copper base 100 with recycling cooling water, and a material feeding tube 104. The vacuum chamber 10 according to the present preferred embodiment is divided into a precipitation chamber 101 and a crucible in/out chamber 103. One or more isolation valves 102 are adapted between the precipitation chamber 101 and the crucible in/out chamber 103, so that the precipitation chamber 101 can be maintain in vacuum or in the inert gas no matter separation or crucible in/out is undergoing.

The first crucible 12, the electromagnetic induction heat device 14, the hoist mechanism 17, the water-cooled copper base 100, and the material feeding tube 104 are set in the precipitation chamber 101 of the vacuum chamber 10. The first crucible is set on the electromagnetic induction heat device 14. The hoist mechanism 17 is also set on top of precipitation chamber 101 of the vacuum chamber 10. The water-cooled copper base 100 is set on one side of the first crucible 12. The material feeding tube 104 penetrates the vacuum chamber 10.

According to the present invention, place a first metal mineral stone to the first crucible 12 on the crucible in/out chamber 103 of the vacuum chamber 10, and gas an inert gas to the vacuum chamber 10. Use the hoist mechanism 17 to put the first crucible 12 loaded with the first metal mineral stone to the precipitation chamber 101 filled with the inert gas and into the electromagnetic induction heat device 14. The electromagnetic induction heat device 14 heats the first crucible 12 loaded with the first metal mineral stone, melts the first metal mineral stone to a melting liquid.

Then, a second metal mineral stone via the feeding tube 104 penetrating the vacuum chamber 10, the second metal mineral stone is added into the first crucible 12 loaded with the melting liquid. By using the electromagnetic induction heat device 14, the first crucible 12 loaded with the second metal mineral stone and the melting liquid. Next, control the temperate of the electromagnetic induction heat device 14 to fall within a temperature range for the melting mixture liquid to precipitate an alloy in the solid-state. Then, separate the residual liquid in the first crucible 12 from the precipitated the alloy.

And, place a first metal mineral stone in the second crucible 16 and put it to the precipitation chamber 101 of the vacuum chamber 10. Use the hoist mechanism 17, which is capable of inclining, to put the first crucible 12 loaded with residual liquid to the second crucible 18, and put the first crucible 12 on the water-cooled copper base 100 in the precipitation chamber 101. The water-cooled copper base 100 cools the alloy in the first crucible 12. After cooling, use the hoist mechanism 17 to pick the first crucible 12 out, and take the alloy from the first crucible 12. The water-cooled copper base 100 is adapted in the precipitation chamber 101. Because the activity of the alloy is very high, it tends to react with oxygen or even ignite, deteriorating its characteristics and producing dangers, it is necessary to cool sufficiently before drawing out from the precipitation chamber 101 in vacuum or filled with the inert gas.

In mass production, for example, smelt above hundreds of kilograms or tons, the cooling rate of nature cooling is insufficient, and thus limiting the production efficiency. Thereby, the water-cooled copper base is equipped in the precipitation chamber 101. By taking advantage of the excellent heat-sinking characteristic of copper, the first crucible loaded with the high-purity alloy can be quenched rapidly.

To sum up, the present invention provides a method and apparatus for manufacturing a high-purity alloy, which can be used for manufacturing a high-purity alloy without the need of adopting the method of physical vapor deposition or high purity powder metallurgy, so as to economize the cost of the method of physical vapor deposition or high purity powder metallurgy and the high-purity alloy is got. In addition, the residual liquid after precipitation reaction can be recycled and the high-purity alloy can be manufactured continuously.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention is included in the appended claims of the present invention.

The invention claimed is:

1. An apparatus for manufacturing high-purity alloy, comprising:
    a vacuum chamber including a feeding tube;
    a first crucible disposed in the vacuum chamber;
    an electromagnetic induction heat device surrounded the first crucible; and
    a second crucible disposed in the vacuum chamber, and on one side of the first crucible.

2. The apparatus of claim 1, wherein the top of said first crucible has a curved fringe for hanging.

3. The apparatus of claim 1, wherein the top of said second crucible has a curved fringe for hanging.

4. The apparatus of claim 1, further comprising a chilled plate deposes the bottom of said first crucible, and said chilled plate is designed to move up and down by a hoist mechanism.

* * * * *